United States Patent [19]

Tanaka

[11] Patent Number: 4,805,030
[45] Date of Patent: Feb. 14, 1989

[54] METHOD OF IMAGE SIGNAL ENCODING BY ORTHOGONAL TRANSFORMATION

[75] Inventor: Nobuyuki Tanaka, Kanagawa, Japan

[73] Assignee: Fuji Photo Film Co., Ltd., Kanagawa, Japan

[21] Appl. No.: 7,218

[22] Filed: Jan. 27, 1987

[30] Foreign Application Priority Data

Jan. 27, 1986 [JP] Japan .................................. 61-15263
Apr. 18, 1986 [JP] Japan .................................. 61-90535

[51] Int. Cl.$^4$ ........................................... H04N 1/417
[52] U.S. Cl. ..................................... 358/260; 358/280; 358/283; 358/261.3; 382/56
[58] Field of Search ............... 358/260, 133, 138, 280, 358/261, 283; 382/56; 364/723, 725, 726, 826, 727

[56] References Cited

U.S. PATENT DOCUMENTS

| | | | |
|---|---|---|---|
| 3,984,626 | 10/1976 | Mounts et al. | 358/135 |
| 4,001,564 | 1/1977 | Bied-Charreton | 360/40 |
| 4,293,920 | 10/1981 | Merola | 358/260 |
| 4,432,019 | 2/1984 | Maier | 358/260 |
| 4,504,860 | 3/1985 | Nicol et al. | 358/260 |
| 4,656,500 | 4/1987 | Mori | 358/260 |
| 4,698,689 | 10/1987 | Tzou | 358/260 |

FOREIGN PATENT DOCUMENTS 0053064 2/1982 France.

OTHER PUBLICATIONS

European Search Report, EP 87 10 1104.

Primary Examiner—Edward L. Coles, Sr.
Attorney, Agent, or Firm—Sughrue, Mion, Zinn, Macpeak and Seas

[57] ABSTRACT

A method of image signal encoding comprises the steps of conducting two-dimensional orthogonal transformation on each block of two-dimensional image signals based on a predetermined orthogonal function, recognizing a region, where absolute values of almost all of the transformed signals obtained by the orthogonal transformation are smaller than a predetermined value, from a matrix of the transformed signals arranged in the order of sequency of the orthogonal function in the block, and sampling only the transformed signals outside of the recognized region. Or, characteristic values corresponding to absolute values of the transformed signals are added from the high frequency component side toward the low frequency component side, and only the transformed signals on the frequency side lower than the frequency corresponding to the transformed signal at which the sum obtained by the addition comes up to a predetermined value are sampled. The sampled signals are encoded respectively with an intrinsic code length.

20 Claims, 6 Drawing Sheets

METHOD OF IMAGE SIGNAL ENCODING BY ORTHOGONAL TRANSFORMATION

BACKGROUND OF THE INVENTION

1. Field of the Invention

This invention relates to a method of encoding image signals for the purpose of signal compression. This invention particularly relates to a method of encoding image signals by orthogonal transformation.

2. Description of the Prior Art

Image signals representing half tone images, such as television signals, are composed of enormous amounts of information, and a broad-band transmission line is required for transmission of the image signals. Such image signals involve such redundancy, and various attempts have been made to compress the image signals by restricting the redundancy. Also, in recent years, recording of half tone images on optical disks, magnetic disks, or the like has been generally put into practice. In this case, image signal compression is conducted generally for the purpose of efficiently recording image signals on a recording medium.

As one of the methods of image signal compression, a method utilizing orthogonal transformation of image signals is well known. In this method, digital two-dimensional image signals are divided into blocks comprising an appropriate number of samples, and orthogonal transformation of a value string comprising the sample values is conducted for each block. Since energy is concentrated at a specific component by the orthogonal transformation, a component of high energy level is encoded (quantized) by allocating a long code length thereto, and a component of low energy level is encoded coarsely with a short code length, thereby reducing the number of codes per block. As the orthogonal transformation, Fourier transformation, cosine transformation, Hadamard transformation, Karhunen-Loève transformation, or Harr transformation is usually used. The aforesaid image signal compression method will hereinbelow be described in further detail by taking the Hadamard transformation as an example. As shown in FIG. 2, blocks are formed by dividing digital two-dimensional image signals in a unit of, for example, two signals in a predetermined one-dimensional direction. When sample values $x(0)$ and $x(1)$ in the block are plotted on an orthogonal coordinate system, since correlation therebetween is high as mentioned above, most of the sample values are distributed near the straight line represented by the formula $x(1)=x(0)$ as shown in FIG. 3. Therefore, as shown in FIG. 3, the orthogonal coordinate system is transformed by an angle of 45° to determine a new $y(0)$-$y(1)$ coordinate system. On the $y(0)$-$y(1)$ coordinate system, $y(0)$ represents the low frequency component of the original image signals prior to transformation, and attains a value slightly larger than $x(0)$ and $x(1)$ [a value approximately $\sqrt{2}$ times the values of $x(0)$ and $x(1)$]. On the other hand, values of $y(1)$ representing the high frequency component of the original image signals are distributed just within a very narrow range near the $y(0)$ axis. In the case where a code length of, for example, seven bits is required for encoding of $x(0)$ and $x(1)$, seven bits or eight bits are required for encoding of $y(0)$. On the other hand, $y(1)$ can be encoded with a code length of, for example, four bits. Consequently, the code length per block is shortened, and compression of the image signals is achieved.

Orthogonal transformation of second order wherein each block is constituted by two image signals is conducted as mentioned above. As the order is increased, the tendency of energy concentrating at a specific component is increased, and it becomes possible to improve the effect of decreasing the number of bits. In general, the aforesaid transformation can be conducted by use of an orthogonal function matrix. In an extreme case, when an intrinsic function of the objective image is selected as the orthogonal function matrix, the transformed image signals are constituted by the intrinsic value matrix, and the original image can be expressed just by the diagonal component of the matrix. Also, instead of dividing the image signals just in a single direction to form blocks as mentioned above, each block may be constituted by two-dimensional image signals. In this case, the effect of decreasing the number of bits is markedly improved over the one-dimensional orthogonal transformation.

The transformed signals obtained by the aforesaid two-dimensional orthogonal transformation are arranged in the order of the sequency (i.e. the number of "0" position crossing) of the orthogonal function utilized for the transformation in each block. Since the sequency is correlated with the spatial frequency, the transformed signals are put side by side in the longitudinal and transverse directions in the order of the frequency as shown in FIG. 4. Therefore, the code length per block may be shortened by allocating a comparatively long code length to the transformed signals representing the low frequency component (i.e. the signals on the left upper side in FIG. 4) as in the case where a longer code length is allocated to $y(0)$ in the aforesaid one-dimensional orthogonal transformation of second order, and allocating a comparatively short code length to or discarding the transformed signals representing the high frequency component (i.e. the signals on the right lower side in FIG. 4).

As well known, the aforesaid discarding of the transformed signals is conducted by zonal sampling. Specifically, since the transformed signals are arranged side by side in the order of the frequency in the longitudinal and transverse directions in each block B as shown in FIG. 4, the transformed signals y of the same frequency component are placed on a circular arc R having its center at the transformed signal $y(1,1)$ of the sequency 0. Therefore, when the transformed signals y inside of, for example, a zone Z indicated by hatching in FIG. 4, are sampled and only the sampled transformed signals y are encoded, it is possible to compress the signals markedly.

However, the condition of distribution of the transformed signals inside of the block B is different among images or blocks. Therefore, when the zone Z is fixed, there arises problem that the transformed signals useful for image reproduction are discarded and the image quality of the reproduced image is deteriorated in some blocks, or that even transformed signals which are not so useful for image reproduction are sampled and the effects of image signal compression cannot be increased in other blocks. In order to eliminate these problems, there has heretofore been proposed a method wherein a plurality of sampling zone patterns are prepared, a suitable zone pattern is selected by recognizing the condition of distribution of the transformed signals in each block, and zonal sampling is conducted based on the selected zone pattern. However, with this proposed method, since the number of zone patterns which can be prepared is practically limited, it may occur that zonal sampling is conducted based on a zone pattern which is not so suitable.

SUMMARY OF THE INVENTION

The primary object of the present invention is to provide a method of image signal encoding by orthogonal transformation, in which the effects of image signal compression is increased markedly for every block of image signals without deteriorating the image quality of the reproduced image.

Another object of the present invention is to provide a method of image signal encoding by orthogonal transformation, which is free from the drawback that useful transformed signals are discarded in the course of encoding of the transformed signals and the image quality of the reproduced image is deteriorated.

The specific object of the present invention is to provide a method of image signal encoding by orthogonal transformation, which prevents block distortion from arising in the reproduced image.

The present invention provides a method of image signal encoding by orthogonal transformation, which comprises the steps of:

(i) conducting two-dimensional orthogonal transformation on each block of two-dimensional image signals on the basis of a predetermined orthogonal function, (ii) recognizing a region where absolute values of almost all of the transformed signals obtained by the orthogonal transformation are smaller than a predetermined value, from a matrix of the transformed signals put side by side in the order of sequency of said orthogonal function in longitudinal and transverse directions in the block, and (iii) sampling only the transformed signals outside of said recognized region, and encoding the sampled transformed signals respectively with an intrinsic code length.

The present invention also provides a method of image signal encoding by orthogonal transformation wherein orthogonal transformation is conducted on each block of two-dimensional image signals on the basis of a predetermined orthogonal function, and transformed signals obtained by the orthogonal transformation and put side by side in the order of sequency of said orthogonal function in the block are respectively encoded with an intrinsic code length, wherein the improvement comprises the steps of:

(i) adding characteristic values corresponding to absolute values of the respective transformed signals in said block sequentially from the high frequency component side toward the low frequency component side, (ii) sampling in each block only the transformed signals on the frequency side lower than the frequency corresponding to the transformed signal at which the sum obtained by said addition comes up to a predetermined value, and (iii) encoding the sampled transformed signals respectively with an intrinsic code length.

The present invention further provides a method of image signal encoding by orthogonal transformation as mentioned second, wherein the improvement comprises the step of:

sampling in each block only the transformed signals on the frequency side lower than (a) the frequency corresponding to the transformed signal at which the sum obtained by said addition comes up to a predetermined value, or (b) a critical frequency specified in advance, whichever higher.

The present invention also provides a method of image signal encoding by orthogonal transformation as mentioned second, which further comprises the step of: correcting the sampling regions in the blocks adjacent to each other so that the difference between said sampling regions becomes not larger than a predetermined value when said difference is larger than said predetermined value.

The present invention further provides a method of image signal encoding by orthogonal transformation wherein orthogonal transformation is conducted on each block of two-dimensional image signals on the basis of a predetermined orthogonal function, and transformed signals obtained by the orthogonal transformation and put side by side in the order of sequency of said orthogonal function in the block are respectively encoded with an intrinsic code length, wherein the improvement comprises the steps of:

(i) adding characteristic values corresponding to absolute values of the respective transformed signals in said block sequentially from the high frequency component side toward the low frequency component side, (ii) comparing in each block a frequency corresponding to the transformed signal, at which the sum obtained by said addition comes up to a predetermined value, with a critical frequency specified in advance, (iii) sampling only the transformed signals on the frequency side lower than said critical frequency in the case where said frequency corresponding to the transformed signal, at which the sum obtained by said addition comes up to the predetermined value, is higher than said critical frequency, and sampling only the transformed signals on the frequency side lower than said frequency corresponding to the transformed signal, at which the sum obtained by said addition comes up the predetermined value, in the case where said frequency corresponding to said transformed signal is not higher than said critical frequency, and (iv) encoding the sampled transformed signals respectively with an intrinsic code length.

The present invention also provides a method of image signal encoding by orthogonal transformation mentioned fifth, which further comprises the step of:

(v) correcting the sampling regions in the blocks adjacent to each other so that the difference between said sampling regions becomes not larger than a predetermined value when said difference is larger than said predetermined value.

As the characteristic values corresponding to the absolute values of the transformed signals, it is possible to use the absolute values of the transformed signals themselves, the square values of the transformed signals, or the like.

With the method of image signal encoding by orthogonal transformation in accordance with the present invention, in the course of zonal sampling of the transformed signals obtained by conducting orthogonal transformation of each block of image signals, it is possible to adjust the sampling region to a very small region which ensuring that all of the transformed signals useful for image reproduction are sampled. Therefore, it is possible to markedly increase the signal compression ratio without deteriorating the image quality of the image reproduced through signal compression.

Particularly, with the third-mentioned method of image signal encoding by orthogonal transformation in accordance with the present invention, since the lower limit of the zonal sampling region is determined so that the region does not become too small, it is possible to prevent useful transformed signals from being discarded in the course of encoding of the transformed signals and to prevent the image quality of the reproduced image from being deteriorated.

Also, with the fourth- and sixth-mentioned methods of image signal encoding by orthogonal transformation in accordance with the present invention, since the sampling regions of the blocks adjacent to each other are prevented from becoming greatly different from each other, it is possible to eliminate block distortion, i.e. a difference in density at the boundary between the adjacent blocks, in the reproduced image.

FIGS. 9 and 17 are explanatory views respectively showing the zonal samplings in the second- and fifth-mentioned methods of image signal encoding by orthogonal transformation in accordance with the present invention. In the case where the transformed signals which are not so important for image reproduction are comparatively broadly distributed in the high frequency region on the right lower side in FIG. 9 or 17, the absolute values of said transformed signals are generally small, and therefore the transformed signal at which the sum of the aforesaid characteristic values comes up to the predetermined value is present on a lower frequency side. Accordingly, in this case, with the second- to sixth-mentioned methods of the present invention, the region of the zonal sampling is adjusted to be comparatively narrow, many transformed signals which are not so important are discarded, and the effect on image signal compression is enhanced.

On the other hand, in the case where many transformed signals having large absolute values, which are important to some extent for image reproduction, are present in the high frequency region in FIG. 9 or 17, the transformed signal at which the sum of the aforesaid characteristic values comes up to the predetermined value is present on a higher frequency side. Accordingly, in this case, the region of the zonal sampling is adjusted to be comparatively broad, and there is no risk of transformed signals useful for image reproduction being discarded, though the effect on image signal compression becomes somewhat small.

Also, with the fifth- and sixth-mentioned methods of method of image signal encoding by orthogonal transformation in accordance with the present invention, since the transformed signals on the frequency side lower than the critical frequency are zone-sampled in the case where the frequency corresponding to the transformed signal at which the sum of the aforesaid characteristic values comes up to the predetermined value is higher than the critical frequency, there is no risk of the zonal sampling region being enlarged unnecessarily when the transformed signals which are not so important for image reproduction are broadly distributed in the high frequency region, and the signal compression ratio is maintained to be high.

DESCRIPTION OF THE PREFERRED EMBODIMENTS

The present invention will hereinbelow be described in further detail with reference to the accompanying drawings.

Figure 1:
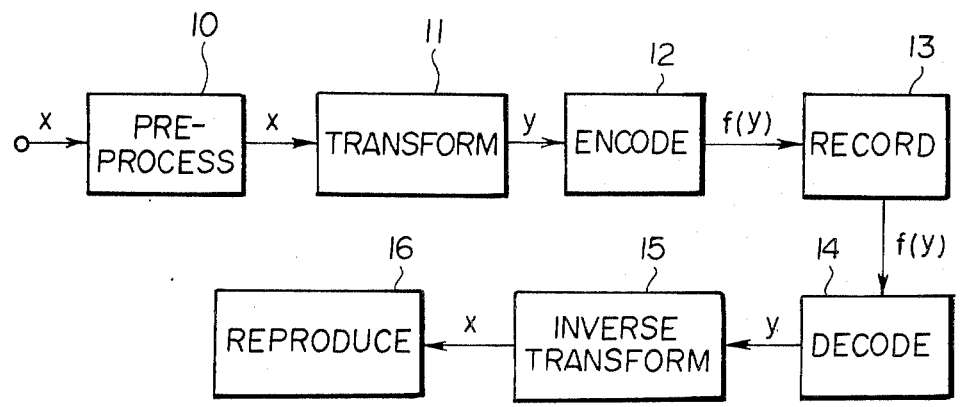
FIG. 1 is a block diagram showing the configuration of an apparatus for carrying out a first embodiment of the method of image signal encoding by orthogonal transformation in accordance with the present invention.
Figure 2:
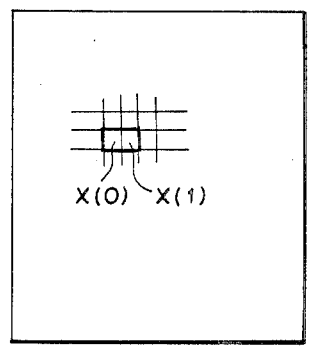
FIGS. 2 and 3 are explanatory views showing the orthogonal transformation in accordance with the present invention.
Figure 3:
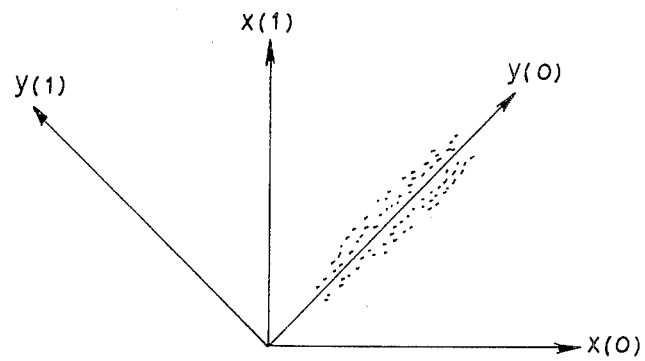
Figure 5:
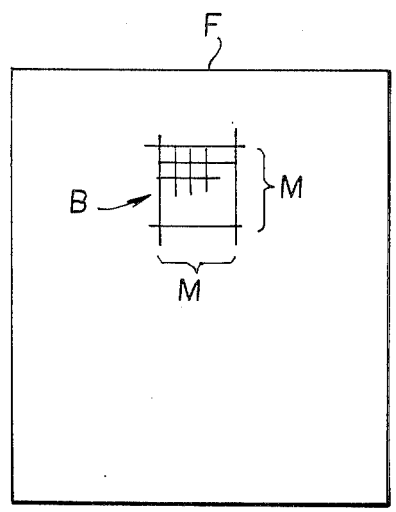

Referring to FIG. 1 schematically showing an apparatus for carrying out a first embodiment of the method of image signal encoding by orthogonal transformation in accordance with the present invention, image signals (original image signals) x representing a half tone image are first sent to a pre-processing circuit 10 and subjected therein to preprocessing for improvement of the signal compression efficiency, for example, smoothing for noise removal. The pre-processed image signals x are sent to an orthogonal transformation circuit 11 and subjected therein to two-dimensional orthogonal transformation. For example, as shown in FIG. 5, the two-dimensional orthogonal transformation is conducted in a unit of a square block B comprising M×M number of samples (picture elements) in a half tone image F represented by the image signals x. As the orthogonal transformation, Hadamard transformation may be used. Since the transformation matrix in Hadamard transformation is constituted just by +1 and −1, Hadamard transformation can be executed by use of a transformation circuit simpler than in the other orthogonal transformations. Also, as well known, two-dimensional orthogonal transformation can be reduced to one-dimensional orthogonal transformation. Specifically, the two-dimensional orthogonal transformation is carried out by subjecting the image signals at the M×M number of picture elements in the two-dimensional block B to one-dimensional orthogonal transformation in the longitudinal direction, and then subjecting the M×M number of transformed signals thus obtained to one-dimensional orthogonal transformation in the transverse direction. The transformation in the longitudinal direction and the transformation in the transverse direction may be conducted in the reverse order.

Figure 4:
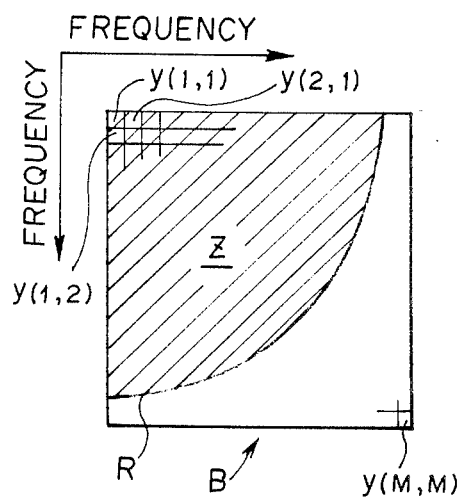
FIGS. 4, 5, 6 and 7 are explanatory views showing the first embodiment of the method of image signal encoding by orthogonal transformation in accordance with the present invention shown in FIG. 1.

As shown in FIG. 4, transformed signals obtained by the two-dimensional orthogonal transformation are put side by side in each block in the longitudinal and transverse directions in the order of the sequency of the function on which the orthogonal transformation is based (for example, the Walsh function in the case of Hadamard transformation, or the trigonometrical function in the case of Fourier transformation). Since the sequency corresponds to the spatial frequency, the transformed signals y are arranged in the order of the spatial frequency, i.e. in the order of the density of the detail components of the image, in the longitudinal and transverse directions in the block B. In FIG. 4, a transformed signal $y(1,1)$ at the left end column on the top line corresponds to sequency 0 (zero). As well known, the transformed signal $y(1,1)$ represents the average image density in the block B.

The transformed signals y thus arranged are sent to an encoding circuit 12 and encoded thereby. At this time, the encoding circuit 12 extracts the transformed signals y along a circular arc R having its center at the position of the transformed signal $y(1,1)$ as shown in FIG. 4 in each block B, and compares the absolute values of the transformed signals y thus extracted with a predetermined value "a". The comparison is conducted by starting with a circular arc R having a substantially small radius, ceasing the comparison when at least one of the absolute values of the transformed signals y along the circular arc R is found to be not smaller than the predetermined value "a", and then repeating the same operation by increasing the radius of the circular arc R by a single signal column. When the comparison operations are conducted sequentially and all of the transformed signals y along the circular arc R are found to become smaller than the predetermined value "a", the encoding circuit 12 encodes the transformed signals y along the circular arc R in accordance with a predetermined format. Or, the comparison may be conducted by starting with a circular arc R having a substantially large radius, repeating the same operation by decreasing the radius of the circular arc R by a single signal column when all of the absolute values of the transformed signals y along the circular arc R are smaller than the predetermined value "a", and repeating the comparison until at least one of the absolute values of the transformed signals y along the circular arc R is found to be not smaller than the predetermined value "a". Also, the encoding circuit 12 sampling all of the transformed signals y present in a zone Z inward of the circular arc R toward the transformed signal $y(1,1)$, and encodes the transformed signals y thus sampled. Since energy is concentrated at the low frequency component in the transformed signals y as mentioned above, it is possible to decrease the number of bits required per block B and to achieve image signal compression by allocating a comparatively long code length to the low frequency component with high energy, and allocating a comparatively short code length to the high frequency component with low energy. Also, in this case, since the transformed signals y on the higher frequency side with respect to the circular arc R are discarded without being sampled, it is possible to compress the image signals to a high extent.

The predetermined value "a" defining the zonal sampling region Z is adjusted to such a value that the transformed signals y which are not so useful for image reproduction are discarded as much as possible. When the zonal sampling region A is determined for each block B based on the predetermined value "a" thus adjusted, the region Z varies in accordance with the distribution condition of the transformed signals y in each block B, i.e. in accordance with the distribution condition of the image signals x, and minimum transformed signals y useful for image reproduction are sampled in every block B.

The image signals f(y) encoded in the aforesaid manner, including the encoded signals representing the circular arc R, are recorded on a recording medium (image file) such as an optical disk, or a magnetic disk in a recording and reproducing apparatus 13. Since the image signals f(y) have been markedly compressed as compared with the original image signals x, a large number of images can be recorded on the recording medium, which may be an optical disk. When the image is to be reproduced, the image signals f(y) are read out from the recording medium, and decoded into the transformed signals y in a decoding circuit 14. At this time, based on the signals representing the circular arc R, the decoding circuit 14 allocates a null bit to the transformed signals y in the region on the higher frequency side with respect to the circular arc R in each block, i.e. in the region unhatched in FIG. 4. The transformed signals y thus decoded are sent to an inverse transformation circuit 15 and transformed inversely to the aforesaid two-dimensional orthogonal transformation. The original image signals x are thus restored, and sent to an image reproducing apparatus 16 for use in reproduction of the image which the image signals x represent.

Figure 6:
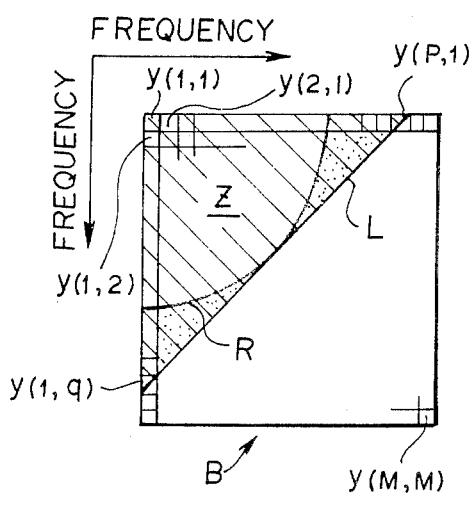

In the aforesaid embodiment, the zonal sampling region Z is determined by comparing all of the transformed signals y along the circular arc R in FIG. 4 with the predetermined value "a". However, the region Z may be determined by use of any other method. For example, as shown in FIG. 6, the transformed signals y on the end line in the block B and the transformed signals y on the end column in the block B may be compared with a predetermined value "b", and a straight line L passing through transformed signals $y(p,1)$ and $y(1,q)$ which are smaller than the predetermined value "b" and nearest to the transformed signal $y(1,1)$ may be taken as the boundary of the zonal sampling region Z. In this case, the predetermined value "b" is adjusted so that the straight line L contacts the circular arc R defining the sampling region based on the predetermined value "a". Accordingly, all of the transformed signals y useful for image reproduction are sampled. In this case, the transformed signals y in the regions indicated by dotting in FIG. 6 are sampled though they are not so useful for image reproduction.

Figure 7:
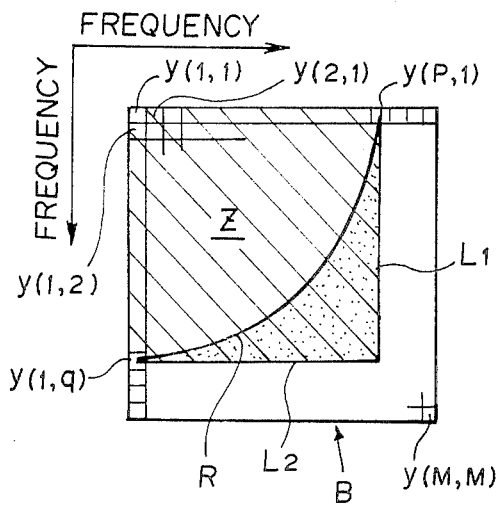

Also, as shown in FIG. 7, instead of using the straight line L mentioned above, the zonal sampling region Z may be defined by straight lines L1 and L2 extending in the array directions of the transformed signals y from the transformed signals $y(p,1)$ and $y(1,q)$. In this case, when the predetermined value "a" is used, instead of the predetermined value "b", in the course of finding the transformed signals $y(p,1)$ and $y(1,q)$, all of the transformed signals y useful for image reproduction are sampled. Also, in this case, the transformed signals y in the regions indicated by dotting in FIG. 7 are sampled though they are not so useful for image reproduction.

Figure 8:
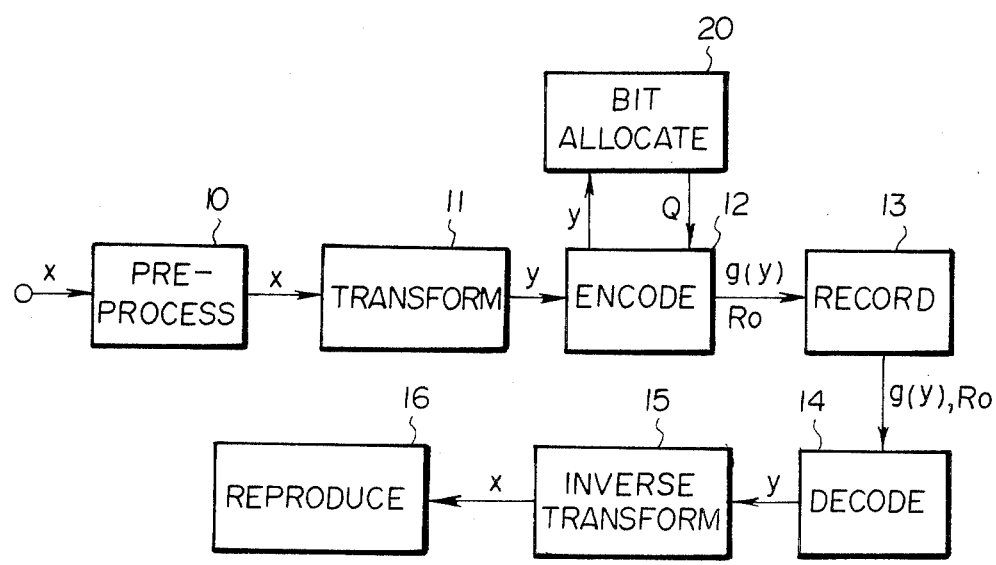
FIG. 8 is a block diagram showing the configuration of an apparatus for carrying out a second embodiment of the method of image signal encoding by orthogonal transformation in accordance with the present invention.
Figure 10:
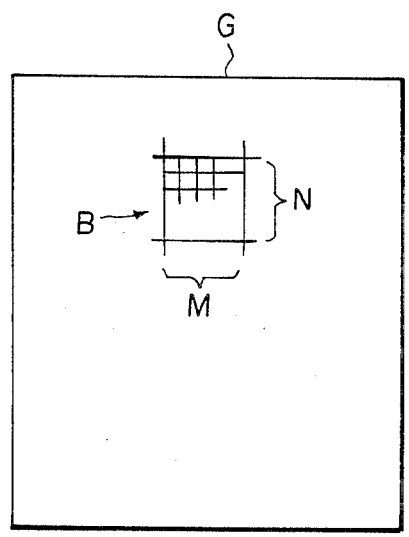
FIG. 10 is an explanatory view showing the block division of an image in the second embodiment of FIG. 8.

FIG. 8 schematically shows the configuration of an apparatus for carrying out a second embodiment of the method of image signal encoding by orthogonal transformation in accordance with the present invention. In FIG. 8, similar elements are numbered with the same reference numerals with respect to FIG. 1. In this embodiment, the two-dimensional orthogonal transformation is conducted in a unit of, for example, a rectangular block B comprising M×N number of samples (picture elements) in a half tone image G represented by the image signals x as shown in FIG. 10.

Figure 11:
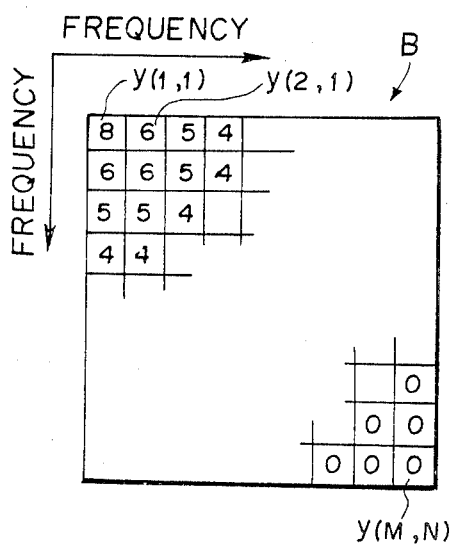
FIG. 11 is an explanatory view showing the bit allocation table in the second embodiment of FIG. 8, FIGS. 12, 13 and 14 are flow charts respectively showing the flows of bit allocation decision processing in the second, third and fourth embodiments of the method of image signal encoding by orthogonal transformation in accordance with the present invention.

The transformed signals y arranged in the order of the sequency of the function on which the two-dimensional orthogonal transformation is based are sent to the encoding circuit 12 as shown in FIG. 8. The encoding circuit 12 encodes each of the transformed signals y in the block B with a code length (i.e. a number of bits) in accordance with a bit allocation table created as described later. In the bit allocation table, an intrinsic number of bits is allocated for each sequency, for example, as shown in FIG. 11. As mentioned above, it is possible to decrease the number of bits required per block B and to achieve image signal compression by allocating a comparatively long code length to the low frequency component with high energy, and allocating a comparatively short code length to the high frequency component with low energy. The effect of image signal compression is more increased by allocating a null bit to the transformed signals y carrying a particularly high frequency component as shown in FIG. 11, thereby discarding them, and sampling only the other transformed signals y (i.e. conducting the zonal sampling).

However, it becomes impossible to substantially increase the effect of image signal compression when the region of the zonal sampling is too broad, and many transformed signals y useful for image reproduction are discarded when the region of the zonal sampling is too narrow. The requirement of the embodiment of FIG. 8 for adjusting the zonal sampling region in accordance with the condition of distribution of the transformed signals y different among images and blocks will hereinbelow be described.

Figure 9:
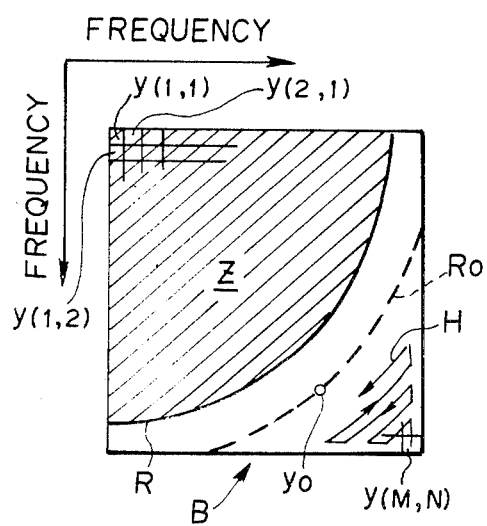
FIG. 9 is an explanatory view showing the zonal sampling in the second embodiment of the method of image signal encoding by orthogonal transformation in accordance with the present invention.
Figure 12:
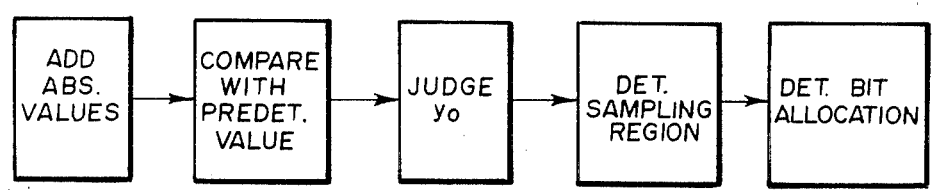

A bit allocation determining section 20 connected to the encoding circuit 12 as shown in FIG. 8 receives the transformed signals y arranged as mentioned above, and adds the absolute values of the transformed signals y sequentially from the high frequency component side to the low frequency component side. Specifically, as indicated by the arrow H in FIG. 9, the addition is conducted by starting with the transformed signal y(M,N) at the maximum sequency, and adding the absolute values of the transformed signals y on a path along the circular arc R having the center at the position of the transformed signal y(1,1). When the sum obtained by the addition comes up to a predetermined value at a transformed signal y, the bit allocation determining section 20 allocates a code length of one bit or more only to the transformed signals y on the frequency side lower than the frequency corresponding to said transformed signal y at which the sum comes up to the predetermined value, and allocates a null bit to the other transformed signals y. More specifically, when the sum comes up to the predetermined value at the transformed signal yo in FIG. 9, a null bit is allocated to the transformed signals y present on a circular arc Ro which is concentric with the circular arc R and on which the transformed signal yo lies, and to the transformed signals y present in the region on the right lower side with respect to the circular arc Ro. The number of bits allocated to each of the transformed signals y to which a code length of one bit or more is to be given may be determined in accordance with an allocating table stored in advance, or may be determined by investigating the actual values of the transformed signals y. The flow of processing for determining the bit allocation at the bit allocation determining section 20 is shown in detail in FIG. 12.

Information Q on the bit allocation determined as mentioned above is sent to the encoding circuit 12, which encodes the transformed signals y in accordance with the bit allocation information Q. In the course of the encoding, the transformed signals y to which a null bit is allocated are discarded as mentioned above, and only the transformed signals y allocated with a code length of one bit or more are sampled and encoded. Since the region of the transformed signals y allocated with a null bit is determined as mentioned above, the zonal sampling region is adjusted to be comparatively narrow in the case where the transformed signals y which are not so important for image reproduction, i.e. which have a small absolute value, are comparatively broadly distributed in the high frequency region in the block B. Accordingly, encoding of the transformed signals y which are not so useful is avoided, and the number of bits required per block B is decreased markedly. On the other hand, in the case where the transformed signals y comparatively important for image reproduction, i.e. having a comparatively large absolute value, are broadly distributed up to the high frequency region in the block B, the zonal sampling region is adjusted to be comparatively broad. Accordingly, in this case, there is no risk of the transformed signals y useful for image reproduction being discarded though the number of bits required per block B becomes larger than in the aforesaid case.

The image signals g(y) encoded in the aforesaid manner and the information on the position of the circular arc Ro are recorded on a recording medium (image file) in the recording and reproducing apparatus 13. Since the image signals g(y) have been markedly compressed as compared with the original image signals x, a large number of images can be recorded on the recording medium. When the image is to be reproduced, the image signals g(y) and the information on the position of the circular arc Ro are read out from the recording medium, and decoded into the transformed signals y in the decoding circuit 14. The transformed signals y thus decoded are sent to the inverse transformation circuit 15 and transformed inversely to the aforesaid two-dimensional orthogonal transformation. The original image signals x are thus restored, and sent to the image reproducing apparatus 16 for use in reproduction of the image which the image signals x represent.

Figure 15:
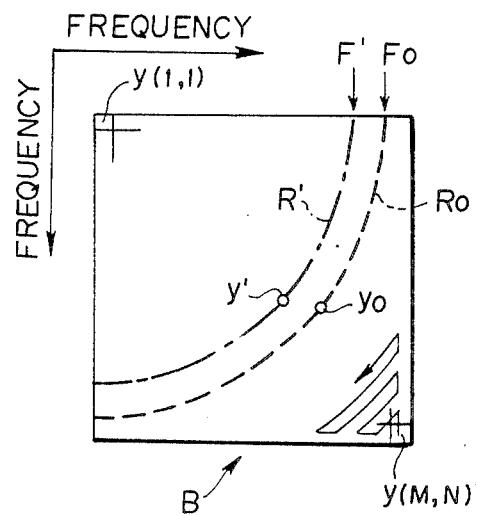
FIGS. 15 and 16 are explanatory views showing the zonal samplings in the third and fourth embodiments of the method of image signal encoding by orthogonal transformation in accordance with the present invention.
Figure 13:
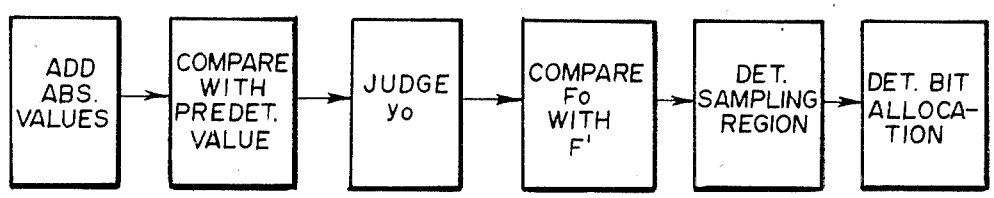

A third embodiment of the method in accordance with the present invention will hereinbelow be described. The third embodiment is carried out by use of an apparatus having a configuration basically identical with the apparatus shown in FIG. 8, except that the bit allocation determining section 20 is provided with a memory means as described later. The processing for determining the bit allocation will be described below with reference to FIG. 13 showing the flow of bit allocation determining processing and FIG. 10. The bit allocation determining section 20 stores a predetermined critical frequency F', and a circular arc R' having its center at the position of the transformed signal y(1,1) and passing through the transformed signal corresponding to the critical frequency F' as shown in FIG. 15 in the memory means. The circular arc R' defines the minimum zonal sampling region that does not cause deterioration of the image quality of the reproduced image. Specifically, when the zonal sampling region is constricted to the lower frequency side with respect to the circular arc R', there is the risk of the image quality of the reproduced image being deteriorated. Such a circular arc R' may be determined experimentally.

In the same manner as in the second embodiment of FIG. 8, the bit allocation determining section 20 adds the absolute values of the transformed signals y sequentially by starting with the transformed signal y(M,N), and finds the transformed signal yo at which the sum obtained by the addition comes up to the predetermined value. Then, the bit allocation determining section 20 judges whether a frequency Fo corresponding to the transformed signal yo or the critical frequency F' is higher. In the case where the frequency Fo corresponding to the transformed signal yo is higher than the critical frequency F' as shown in FIG. 15, the bit allocation determining section 20 takes the region on the lower frequency side with respect to the circular arc Ro having the center at the position of the transformed signal y(1,1) and passing through the transformed signal yo, as the zonal sampling region as in the aforesaid second embodiment. Conversely, in the case where the critical frequency F' is higher than the frequency Fo, i.e. when the transformed signal yo is closer to the transformed signal y(1,1) than is a transformed signal y' on the circular arc R' in FIG. 15, the bit allocation determining section 20 takes the region on the lower frequency side with respect to the circular arc R' as the zonal sampling region. Bit allocation to the transformed signals y in the zonal sampling region thus determined is conducted in the same manner as in the aforesaid second embodiment.

The encoding circuit 12 encodes the transformed signals y in accordance with the bit allocation determined as mentioned above. In the third embodiment, since the zonal sampling region is determined as mentioned above, there is no risk of the zonal sampling region being constricted excessively even when transformed signals y having a small absolute value are distributed broadly in the high frequency region. That is, the zonal sampling region is adjusted to be at least equal to the region on the lower frequency side with respect to the circular arc R'. Since the zonal sampling region is thus adjusted, there is no risk of transformed signals y useful for image reproduction being discarded.

Figure 14:
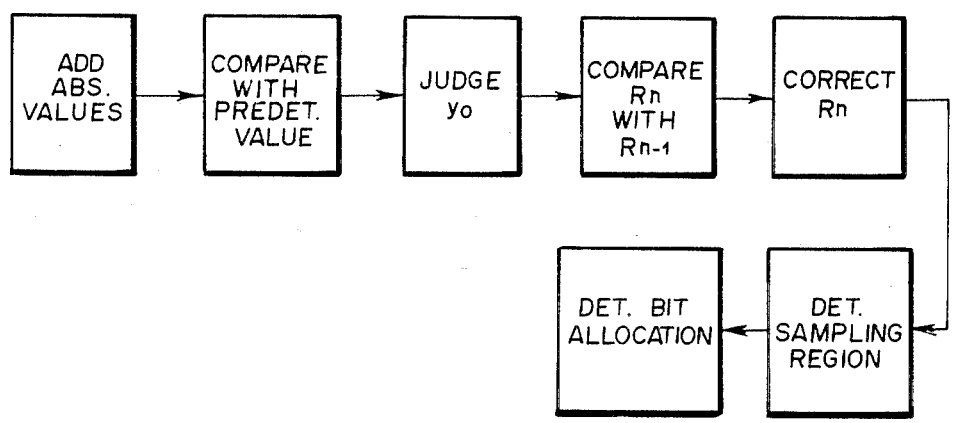
Figure 16:
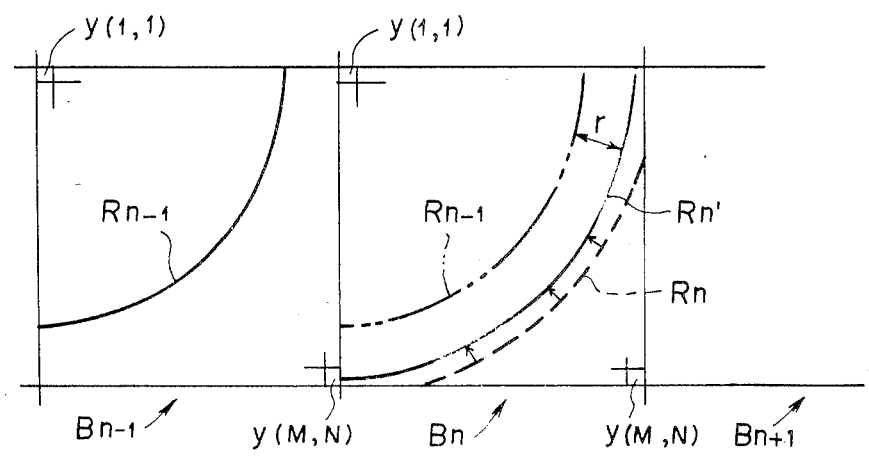

A fourth embodiment of the method in accordance with the present invention will hereinbelow be described. The fourth embodiment is carried out also by use of an apparatus having a configuration basically identical with the configuration of the apparatus shown in FIG. 8, except that the bit allocation determining section 20 is provided with a memory means for storing the zonal sampling region in the adjacent block B. The processing for determining the bit allocation will be described below with reference to FIG. 14 showing the flow of bit allocation determining processing and FIG. 16. The bit allocation determining section 20 determines the zonal sampling region in each block B and the bit allocation in the same manner as in the aforesaid second embodiment, and conducts correction processing so that a difference between the sampling regions in two adjacent blocks becomes smaller than a predetermined value. For example, as shown in FIG. 16, the region on the lower frequency side with respect to a circular arc Rn-1 is taken as the zonal sampling region in a block Bn-1 subjected to n-1'th orthogonal transformation, and the region on the lower frequency side with respect to a circular arc Rn is taken as the zonal sampling region in a block Bn subjected to n'th orthogonal transformation. In the course of determining the bit allocation in the block Bn, the bit allocation determining section 20 stores the information on the circular arc Rn-1 in the memory means, and calculates the difference between the radii of the circular arc Rn-1 and the circular arc Rn. When the difference therebetween is larger than a predetermined value r, the bit allocation determining section 20 corrects the circular arc Rn so that the difference becomes equal to the predetermined value r. FIG. 16 shows the case where the radius of the circular arc Rn is larger than the sum of the radius of the circular arc Rn-1 and the predetermined value r, and therefore the circular arc Rn is corrected to a circular arc Rn' having the radius equal to said sum. Also when the radius of the circular arc Rn is smaller than a value obtained by subtracting the predetermined value r from the radius of the circular arc Rn-1, the circular arc Rn is corrected so that its radius is equal to the value obtained by subtracting the predetermined value r from the radius of the circular arc Rn-1. The bit allocation determining section 20 defines the zonal sampling region by the circular arc Rn' thus corrected, or by the circular arc Rn when no correction is required, and determines the bit allocation in the defined region. Then, the bit allocation determining section 20 encodes the transformed signals y in accordance with the bit allocation. Also, the information on the circular arc Rn or Rn' is stored in the memory means in lieu of the information on the circular arc Rn-1 in the block Bn-1, and utilized for correcting the zonal sampling region in a block Bn+1 subjected thereafter to orthogonal transformation when necessary.

Since the zonal sampling regions are corrected so that the zonal sampling regions in the adjacent blocks do not differ markedly from each other as mentioned above, it becomes possible to prevent block distortion, i.e. occurrence of a difference in density level at the boundary between the blocks in the reproduced image.

In the second, third and fourth embodiments mentioned above, the absolute values of the transformed signals y are added in each block, and the sum thus calculated is compared with the predetermined value. However, it is only necessary that the characteristic values thus added be values with a fixed sign corresponding to the absolute values and, for example, square values of the transformed signals y or the like may be added. Also, since the transformed signals y on the lower frequency side are more important for image reproduction, values weighted with reciprocals of the spatial frequencies which the respective transformed signals y carry should preferably be employed as the aforesaid characteristic values. This is because, in such a case as where the transformed signals y having a small absolute value are distributed broadly in the high frequency region, it becomes possible to prevent the problem that the zonal sampling region is constricted excessively and transformed signals y useful for image reproduction are discarded undesirably.

The predetermined value compared with the sum of the characteristic values may be a suitable value determined in advance, or a value calculated by cumulating all of the characteristic values in the block B and multiplying the cumulated value by a predetermined factor. Or, the characteristic values in the block B other than the characteristic value concerning the transformed signal y(1,1) of the sequency 0 and ordinarily attaining a markedly large value may be cumulated, and a value calculated by multiplying the cumulated value by a predetermined factor may be employed as the aforesaid predetermined value.

Figure 17:
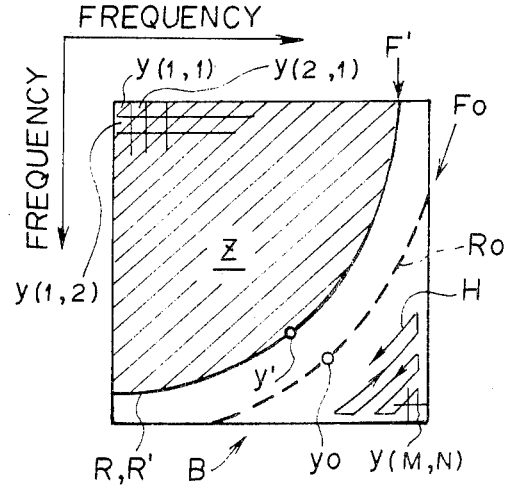
FIGS. 17 and 18 are explanatory views showing the zonal samplings in a fifth embodiment of the method of image signal encoding by orthogonal transformation in accordance with the present invention.

A fifth embodiment of the method in accordance with the present invention will hereinbelow be described. The fifth embodiment is carried out by use of an apparatus having a configuration basically identical with the apparatus shown in FIG. 8, except that the bit allocation determining section 20 is provided with the memory means for storing a predetermined critical frequency F', and a circular arc R' having the center at the position of the transformed signal y(1,1) and passing through the transformed signal corresponding to the critical frequency F' as shown in FIG. 17. The circular arc R' defines the maximum zonal sampling region wherein a signal compression ratio not smaller than a desired value is obtained. Specifically, when the zonal sampling region is enlarged to the higher frequency side with respect to the circular arc R', it may become impossible to realize the desired signal compression ratio. Such a circular arc R' may be determined experimentally.

Figure 18:
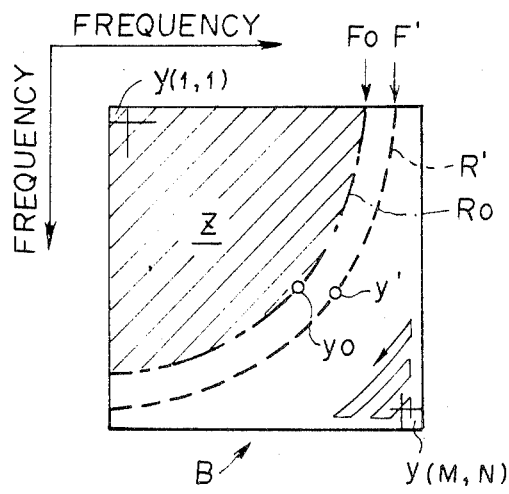

In the same manner as in the second embodiment of FIG. 8, the bit allocation determining section 20 adds the absolute values of the transformed signals y sequentially by starting with the transformed signal y(M,N), and finds the transformed signal yo at which the sum obtained by the addition comes up to the predetermined value. Then, the bit allocation determining section 20 judges whether a frequency Fo corresponding to the transformed signal yo or the critical frequency F' is higher. In the case where the frequency Fo corresponding to the transformed signal yo is higher than the critical frequency F' as shown in FIG. 17, the bit allocation determining section 20 takes the region on the lower frequency side with respect to the circular arc R' as the zonal sampling region. Conversely, in the case where the frequency Fo is not higher than the critical frequency F', i.e. when the transformed signal yo is closer to the transformed signal y(1,1) than is a transformed signal y' on the circular arc R' as shown in FIG. 18, the bit allocation determining section 20 takes the region on the lower frequency side with respect to a circular arc Ro having its center at the position of the transformed signal y(1,1) and passing through the transformed signal yo as the zonal sampling region. Bit allocation to the transformed signals y in the zonal sampling region thus determined is conducted in the same manner as in the aforesaid second embodiment. Processing for determining the bit allocation at the bit allocation determining section 20 is conducted as shown in FIG. 13.

The encoding circuit 12 encodes the transformed signals y in accordance with the bit allocation determined as mentioned above. In the fifth embodiment, since the zonal sampling region is determined as mentioned above, there is no risk of the zonal sampling region being enlarged excessively even when the transformed signals y considered to be comparatively important are distributed broadly up to the high frequency region. Thus since sampling is effected at most only in the region where the frequency is not higher than the critical frequency F', it is possible to always realize a high signal compression ratio.

In a sixth embodiment of the method in accordance with the present invention, the fifth embodiment is modified so that the bit allocation determining section 20 is provided with a memory means for storing the zonal sampling region in the adjacent block B, and corrects the zonal sampling region in the same manner as in the aforesaid fourth embodiment.

In the fifth and sixth embodiments, various values may be employed as the characteristic values which are to be added and as the predetermined value which is to be compared with the sum of the characteristic values as mentioned with reference to the second, third and fourth embodiments. Also, in order to prevent the zonal sampling region from being adjusted to be very narrow, a second critical frequency lower than the aforesaid critical frequency F' may be determined, and the zonal sampling region may be adjusted to the region on the frequency side lower than the second critical frequency even though the frequency corresponding to the transformed signal at which the aforesaid sum comes up to the predetermined value is lower than the second critical frequency.

I claim:
1. A method of image signal encoding by orthogonal transformation, which comprises the steps of:
  (i) dividing two-dimensional image signals into blocks and conducting two-dimensional orthogonal transformation on each block of two-dimensional image signals on the basis of a predetermined orthogonal function,
  (ii) recognizing a region, where absolute values of almost all of the transformed signals obtained by the orthogonal transformation are smaller than a predetermined value, from a matrix of the transformed signals put side by side in order of sequence of said orthogonal function in longitudinal and transverse directions in the block, and
  (iii) sampling only the transformed signals outside of said recognized region, and encoding the sampled transformed signals respectively with an intrinsic code length.

2. A method of image signal encoding by orthogonal transformation wherein two-dimensional image signals are divided into blocks, orthogonal transformation is conducted on each block of two-dimensional image signals on the basis of a predetermined orthogonal function, and transformed signals obtained by the orthogonal transformation and put side by side in the order of sequency of said orthogonal function in the block are respectively encoded with an intrinsic code length, wherein the improvement comprises the steps of:
  (i) adding characteristic value corresponding to absolute values of the respective transformed signals in said block sequentially from a high frequency component side toward a low frequency component side,
  (ii) sampling in each block only the transformed signals on a frequency side lower than a frequency corresponding to the transformed signal at which the use obtained by said addition comes up to a predetermined value, and
  (iii) encoding the sampled transformed signals respectively with an intrinsic code length.

3. A method as defined in claim 2 wherein said characteristic values are the absolute values of said transformed signals.

4. A method as defined in claim 2 wherein said characteristic values are square values of said transformed signals.

5. A method as defined in claim 2 wherein said characteristic values are weighted with reciprocals of spatial frequencies which the corresponding transformed signals carry.

6. A method as defined in claim 3 wherein said characteristic values are weighted with reciprocals of spatial frequencies which the corresponding transformed signals carry.

7. A method as defined in claim 4 wherein said characteristic values are weighted with reciprocals of spatial frequencies which the corresponding transformed signals carry.

8. A method as defined in claim 2 wherein said predetermined value is a value calculated by multiplying a value, which is obtained by cumulating all of the characteristic values in said block, by a predetermined factor.

9. A method as defined in claim 2 wherein said predetermined value is a value calculated by multiplying a value, which is obtained by cumulating all of the characteristic values other than the characteristic value concerning the transformed signal of sequency 0 (zero) in said block, by a predetermined factor.

10. A method of image signal encoding by orthogonal transformation wherein two-dimensional image signals are divided into blocks, orthogonal transformation is conducted on each block of two-dimensional image signals on the basis of a predetermined orthogonal function, and transformed signals obtained by the orthogonal transformation and put side by side in order of sequence of said orthogonal function in the block are respectively encoded with an intrinsic code length, wherein the improvement comprises the steps of:
   (i) adding characteristic values corresponding to absolute values of the respective transformed signals in said block sequentially from a high frequency component side toward a low frequency component side,
   (ii) sampling in each block only the transformed signals on a frequency side lower than (a) a frequency corresponding to the transformed signal at which the sum obtain by said addition comes up to a predetermined value, or (b) a critical frequency specified in advance, whichever higher, and
   (iii) encoding the sampled transformed signals respectively with an intrinsic code length.

11. A method of image signal encoding by orthogonal transformation wherein two dimensional image signals are divided into blocks, orthogonal transformation is conducted on each block of two-dimensional image signals on the basis of a predetermined orthogonal function, and transformed signals obtained by the orthogonal transformation and put side by side in the order of sequence of said orthogonal function in the block are respectively encoded with an intrinsic code length, wherein the improvement comprises the steps of:
   (i) adding characteristic values corresponding to absolute values of the respective transformed signals in said block sequentially from a high frequency component side toward a low frequency component side,
   (ii) sampling in each block only the transformed signals on a frequency side lower that a frequency corresponding to the transformed signal at which the use obtained by said addition comes up to a predetermined value,
   (iii) encoding the sampled transformed signals respectively with an intrinsic code length, and
   (iv) correcting the sampling regions in the blocks adjacent to each other so that the difference between said sampling regions becomes not larger than a predetermined value when said difference is larger than said predetermined value.

12. A method of image signal encoding by orthogonal transformation wherein two-dimensional image signals are divided into blocks, orthogonal transformation is conducted on each block of two-dimensional image signals on the basis of a predetermined orthogonal function, and transformed signals obtained by the orthogonal transformation and put side by side in the order of sequence of said orthogonal function in the block are respectively encoded with an intrinsic code length, wherein the improvement comprises the steps of:
   (i) adding characteristic values corresponding to absolute values of the respective transformed signals in said block sequentially from a high frequency component side toward a low frequency component side,
   (ii) comparing in each block a frequency corresponding to the transformed signal, at which the sum obtained by said addition comes up a predetermined value, with a critical frequency specified in advance,
   (iii) sampling only the transformed signals on a frequency side lower than said critical frequency in the case where said frequency corresponding to the transformed signal, at which the sum obtained by said addition comes up to the predetermined value, higher than said critical frequency, and sampling only the transformed signals on a frequency side lower than said signal, at which the sum obtained by said addition comes up to the predetermined value, in the case where said frequency corresponding to said transformed signal is not higher than said critical frequency, and
   (iv) encoding the sampled transformed signals respectively with an intrinsic code length.

13. A method as defined in claim 12 wherein said characteristic values are the absolute values of said transformed signals.

14. A method as defined in claim 12 wherein said characteristic values are square values of said transformed signals.

15. A method as defined in claim 12 wherein said characteristic values are weighted with reciprocals of spatial frequencies which the corresponding transformed signals carry.

16. A method as defined in claim 13 wherein said characteristic values are weighted with reciprocals of spatial frequencies which the corresponding transformed signals carry.

17. A method as defined in claim 14 wherein said characteristic values are weighted with reciprocals of spatial frequencies which the corresponding transformed signals carry.

18. A method as defined in claim 12 wherein said predetermined value is a value calculated by multiplying a value, which is obtained by cumulating all of the characteristic values in said block, by a predetermined factor.

19. A method as defined in claim 12 wherein said predetermined value is a value calculated by multiplying a value, which is obtained by cumulating all of the characteristic values other than the characteristic value concerning the transformed signal of sequency 0 (zero) in said block, by a predetermined factor.

20. A method of image signal encoding by orthogonal transformation wherein two-dimensional image signals are divided into blocks, orthogonal transformation is conducted on each block of two-dimensional image signals on the basis of a predetermined orthogonal function, and transformed signals obtained by the orthogonal transformation and put side by side in the order of sequence of said orthogonal function in the block are respectively encoded with an intrinsic code length, wherein the improvement comprises the steps of:

(i) adding characteristic values corresponding to absolute values of the respective transformed signals in said block sequentially from a high frequency component side towards a low frequency component side, (ii) comparing in each block a frequency corresponding to the transformed signal, at which the sum obtained by said addition comes up to a predetermined value, with a critical frequency specified in advance, (iii) sampling only transformed signals on a frequency side lower than said critical frequency in the case where said frequency corresponding to the transformed signal, at which the sum obtained by said addition comes up to the predetermined value, is higher than said critical frequency, and sampling only the transformed signals on a frequency side lower than said frequency corresponding to the transformed signal, at which the sum obtained by said addition comes up to a predetermined value, in the case where said frequency corresponding to said transformed signal is not higher than said critical frequency, (iv) encoding the sampled transformed signals respectively with an intrinsic code length, and (v) correcting the sampling regions in the blocks adjacent to each other so that the difference between said sampling regions becomes not larger than a predetermined value when said difference is larger than said predetermined value.

* * * * *